US012581247B2

(12) United States Patent
Vercammen et al.

(10) Patent No.: US 12,581,247 B2
(45) Date of Patent: Mar. 17, 2026

(54) FACILITATING HEARING DEVICE FITTING

(71) Applicant: SONOVA AG, Staefa (CH)

(72) Inventors: Charlotte Vercammen, London (GB); Doris Zahnd, Bäretswil (CH); Sebastian Griepentrog, Staefa (CH)

(73) Assignee: Sonova AG, Staefa (CH)

( * ) Notice: Subject to any disclaimer, the term of this patent is extended or adjusted under 35 U.S.C. 154(b) by 189 days.

(21) Appl. No.: 18/378,398

(22) Filed: Oct. 10, 2023

(65) Prior Publication Data

US 2024/0121560 A1 Apr. 11, 2024

(30) Foreign Application Priority Data

Oct. 11, 2022 (EP) .................................... 22200737

(51) Int. Cl.
*H04R 25/00* (2006.01)

(52) U.S. Cl.
CPC ........... *H04R 25/305* (2013.01); *H04R 25/50* (2013.01); *H04R 2225/39* (2013.01); *H04R 2225/41* (2013.01)

(58) Field of Classification Search
CPC ...... H04R 25/305; H04R 25/70; H04R 25/30; H04R 25/50; H04R 25/507; H04R 2225/39; H04R 2225/41
USPC .......................................................... 381/320
See application file for complete search history.

(56) References Cited

U.S. PATENT DOCUMENTS

| | | | | |
|---|---|---|---|---|
| 10,916,245 | B2 | 2/2021 | Kwatra et al. | |
| 11,218,817 | B1 * | 1/2022 | Ganot | H04R 25/505 |
| 2019/0149927 | A1 | 5/2019 | Zhang et al. | |
| 2022/0295194 | A1 | 9/2022 | Zhang et al. | |
| 2022/0322019 | A1 * | 10/2022 | Guo | H04R 25/453 |

FOREIGN PATENT DOCUMENTS

| | | | |
|---|---|---|---|
| EP | 2306756 | A1 | 4/2011 |
| EP | 3840418 | A1 | 6/2021 |

OTHER PUBLICATIONS

Extended European Search Report sent in application 22200737.9, mailed on Mar. 23, 2023.

* cited by examiner

*Primary Examiner* — Paul Kim
(74) *Attorney, Agent, or Firm* — ALG Intellectual Property, LLC

(57) ABSTRACT

A method includes providing processed sound to a user wearing a hearing device, wherein the hearing device receives environmental sound from an environment of the user, processes the environmental sound with a fitting into the processed sound and outputs the processed sound to the user, wherein the fitting comprises sound processing parameters, which are adapted to needs of the user; receiving, via a user interface, a user text, input by the user, to indicate a problem of the user with the hearing device; and determining a problem diagnosis text and/or a fitting solution from the user text.

13 Claims, 4 Drawing Sheets

FACILITATING HEARING DEVICE FITTING

RELATED APPLICATIONS

The present application claims priority to EP Patent Application No. 22200737.9, filed Oct. 11, 2022, the contents of which are hereby incorporated by reference in their entirety.

BACKGROUND INFORMATION

Hearing devices are generally small and complex devices. Hearing devices can include a processor, microphone, speaker, memory, housing, and other electronical and mechanical components. Some example hearing devices are Behind-The-Ear (BTE), Receiver-In-Canal (RIC), In-The-Ear (ITE), Completely-In-Canal (CIC), and Invisible-In-The-Canal (IIC) devices.

For fitting, and especially fine-tuning of hearing device settings, it is crucial that hearing care professionals and hearing aid wearers understand each other. This is a challenging process in many ways: during a hearing device trial, for instance, hearing care professionals ask new hearing device users to get used to new technology as part of their lives, but also, to pay attention to what they are experiencing when wearing the hearing devices, for example in what situations did they like or dislike the hearing devices and why. The hearing device users have to remember these experiences for a couple of weeks until the next appointment, and then explain these experiences in their own words to the clinician. The hearing care professionals, in turn, need to interpret the user's feedback on the spot, e.g., think of what acoustic parameters might have caused the problems, and react with the correct adjustments and fine-tuning measures to improve the hearing aid fitting.

These communication challenges between hearing care professionals and hearing device users have always been around. Many academics and experts have tried to solve them, e.g., by making lists of commonly experienced fitting problems and linking them to common fitting solutions, either by relying on their own expert knowledge, or by interviewing clinicians and hearing aid users regarding this process.

Very often, these approaches do not directly reflect the users' perspective, rely on retrospective questionnaires or interviews and generate very limited data points to work with, since conducting interviews and processing the outcomes are very labor intensive.

U.S. Pat. No. 10,916,245 B2 proposes an intelligent hearing aid device, in which audio data is received and analyzed for a user according to a plurality of user preferences and interests, historical activity patterns of the user, or a combination thereof. One or more hearing assistive actions may be performed in relation to the audio data to facilitate hearing according to the plurality of user preferences and interests, historical activity patterns of the user, or a combination thereof.

U.S. Pat. No. 2,019,149 927 A1 proposes a system that recognizes and analyses a user's speech when they talk to the hearing aid and describe their listening difficulties. This system may trigger actions to resolve the listening difficulty.

EP 3 840 418 A1 proposes a hearing device fitting procedure with two classifiers, where the first classifier proposes possibly experienced problem statements to the hearing aid wearer based on real time audio data. Choosing one of the problem statements triggers the second classifier to suggest a fitting solution and apply it to the hearing device.

BRIEF DESCRIPTION OF THE DRAWINGS

Below, embodiments are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
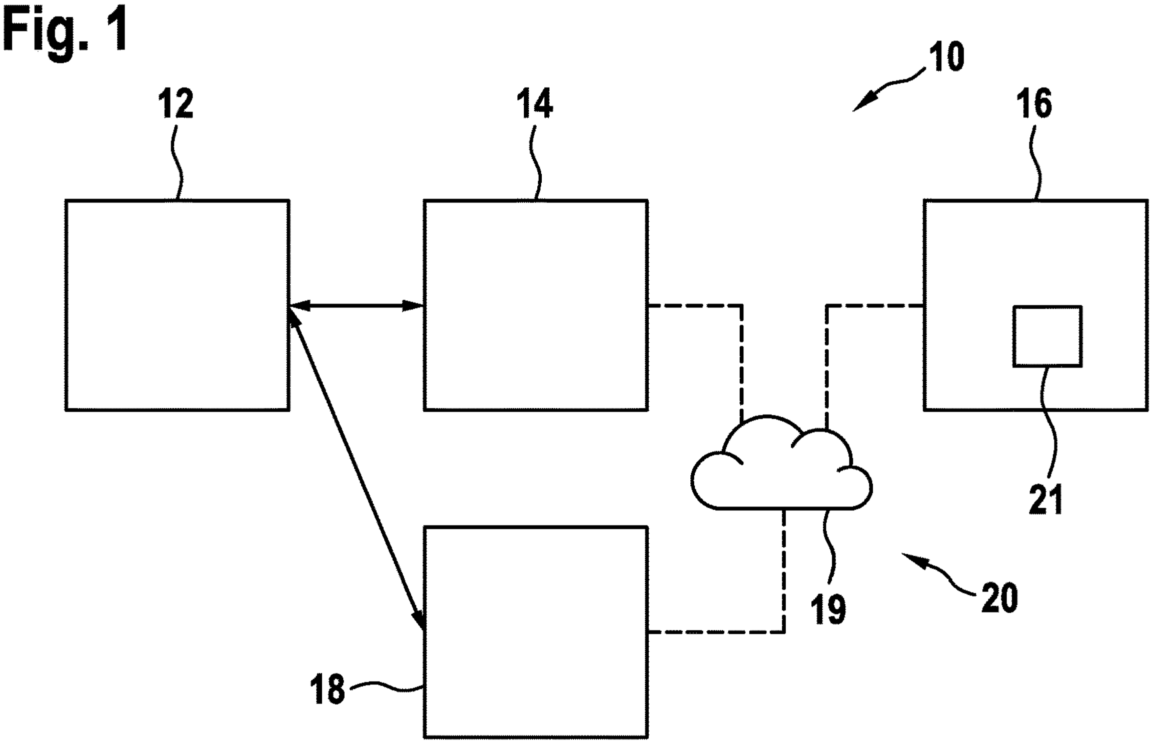
FIG. 1 schematically shows a hearing system according to an embodiment.

Described herein are a method, a computer program and a computer-readable medium for determining a problem diagnosis text and/or a fitting solution for a hearing device. Furthermore, described herein are a hearing system.

It is a feature described herein to facilitate the fitting process of a hearing device. It is a further feature to improve the fitting of a hearing device, such that the fitting is better adapted to the needs of a user.

A first aspect relates to a method for determining a problem diagnosis text and/or a fitting solution and/or an optimized fitting of a hearing device. A hearing device may be a device adapted for acquiring environment sound with a microphone, processing the sound, such that the processed sound is adapted to the needs of a user and outputting the sound to the user, for example with a loudspeaker. The hearing device may be worn by the user behind the ear and/or in the ear. The hearing device may be a hearing aid.

According to an embodiment, the method comprises: providing processed sound to a user wearing the hearing device, wherein the hearing device receives environmental sound from an environment of the user, processes the environmental sound with a fitting into the processed sound and outputs the processed sound to the user, wherein the fitting comprises sound processing parameters, which are adapted to needs of the user. As already mentioned, the environmental sound may be acquired with a microphone and the processed sound may be output by a loudspeaker or other output device, such as a cochlear implant. The processing of the sound may be performed by a processor of the hearing device. The sound processing parameters and/or settings controlling the processing of the sound are called fitting. For example, the fitting may comprise a frequency dependent gain and/or amplification, noise cancelling parameters, parameters for frequency shifting of specific frequency ranges, etc.

It may be that, in a first step, the fitting has been set by a hearing care professional. The method as described in the following may automatically optimize the fitting based on inputs by the user.

According to an embodiment, the method further comprises: receiving, via a user interface, a user text, input by the user to indicate a problem of the user with the hearing device. The problem may be a problem with the fitting of the hearing device and/or with a component of the hearing device, such as the housing. With the user text, the user may describe a problem with the hearing device and/or the fitting in his or her own words.

For example, the user interface device may be provided by a user interface device and/or is a mobile device carried by the user, such as a smartphone. The user interface device may be in data communication with the hearing device, for example for receiving further data and information from the hearing device.

The user may input the user text into a special application running in the user interface device, which then also may perform the following steps of the method. For example, every time, when the user is not satisfied by the processed sound, he or she may enter his or her experience into the user interface device in textual form. Such a text may be "wind noise is too loud" or "cannot hear music in car". In general, the user text may describe a problem of the user from the point of view of a user, who is not an expert in fitting hearing devices. The user text may be received as character string.

According to an embodiment, the method further comprises: determining a problem diagnosis text and/or a fitting solution from the user text.

The problem diagnosis text describes a possibility to modify the sound processing parameters of the fitting and/or a possibility to modify a component of the hearing device for solving the problem indicated by the user text. A problem diagnosis text may describe the problem of the user with respect to the fitting and/or with respect to the knowledge of a hearing care professional. An example for a problem diagnosis text is "noise cancelling is too strong". The problem diagnosis text may be provided as character string. As a further example, the problem diagnosis text may describe a physical problem with the hearing device, such as a problem with the battery or wax guard. In this case, a component of the hearing device, such as the battery or the housing, may be modified, for example exchanged, added or removed.

The fitting solution encodes modified sound processing parameters of the fitting applicable to the hearing device for solving the problem indicated by the user text. The fitting solution may be a data structure, which encodes a new fitting, new fitting parameters and/or modified fitting parameters. A fitting solution may solve the problem, which is described by the corresponding problem diagnosis text. A fitting solution can be directly applied and/or automatically applied to the hearing device.

According to an embodiment, the user text is input into a machine learning algorithm, which outputs the problem diagnosis text and/or the fitting solution, wherein the machine learning algorithm has been trained with user texts and corresponding problem diagnosis texts and/or the fitting solution, which have been collected in a database.

The machine learning algorithm may run in the user interface device or in a server, which is in data connection with the user interface device and/or the hearing device, for example via Internet.

A machine learning algorithm may be trained with a database, in which texts, with which users have described their problems (i.e. user texts) are stored. Such a machine learning algorithm may translate user texts into problem diagnosis texts. The problem diagnosis texts and/or fitting solutions may have been provided by hearing care specialist during fitting, when solving real problems by users. The problem diagnosis texts and/or or fitting solutions may be collected by an application, which is used by the hearing care specialists during fitting.

The machine learning algorithm may have been trained with a database, in which texts, in which hearing care professionals have described the problems of the user, i.e. problem diagnosis texts, and the corresponding fitting solutions, i.e. solutions, which have been applied to the hearing device and helped to solve the problem, are stored. Such data may be collected during fitting of hearing devices by hearing care professionals. It has to be noted that not the fitting solution directly may be output by the machine learning algorithm, but a reference to the fitting solution may be output, which fitting solution is then stored in a database.

It may be that more than one problem diagnosis text and/or more than one fitting solution is determined for one user text. It may be that the same problem diagnosis text and/or fitting solution is found for different user texts. In such a case, a list of problem diagnosis texts and/or fitting solutions may be aggregated, i.e. there may be an n:m-relationship between problem diagnosis texts and fitting solutions and user texts.

With the method, the hearing device fitting can be optimized iteratively, with a large number of iterations, until the hearing device user is satisfied. The hearing device user does not necessarily experience all listening situations relevant for fitting purposes within one day, so the fitting process can take weeks. The method also provides a vocabulary and/or language common to all parties involved and may bridge the language barrier, which may improve and/or speed up the process of fitting. Also a long phase of "trial and error" may be avoided, which may trigger disappointment or reduced satisfaction with the hearing device.

In general, a user of a hearing device can enter text-based information, i.e. the user text, about a fitting problem on site and/or spontaneously during the everyday use of the hearing device. The hearing system performing the method, which may comprise the hearing device, a mobile device and/or a server device, may suggest and/or predict with a trained machine learning algorithm based on the text-based information, one or more useful problem diagnosis texts and/or useful fitting solutions, which can be unambiguously related to a common fitting problem. A possible solution also may be provided as text-based information, i.e. as problem diagnosis text. The predicted fitting solution also may be automatically applied to the hearing device.

According to an embodiment, the machine learning algorithm from above is a second machine learning algorithm, and the method further comprises: determining at least one predicted text from the user text, wherein the user text is input into a first machine learning algorithm, which outputs the at least one predicted text, wherein the first machine learning algorithm has been trained with user texts and corresponding predicted texts, which have been collected in a database.

The first machine learning algorithm may be trained with a database, in which texts, in which user texts input by the user and other users are stored. Such data may be collected in the field during usage of hearing devices and/or during fitting of hearing devices by hearing care professionals. User texts providing predicted texts that result in more detailed problem diagnosis texts may be associated with user texts that result in similar but not so detailed problem diagnosis texts. Further shorter user texts and longer user texts, which complete the shorter users texts and which may be used as predicted texts, may be associated. In some examples, the predicted text may specify a possible problem of the fitting in more concrete terms than the user text. The predicted text may contain at least a part of the user text.

According to an embodiment, the method further comprises: presenting, for example via the user interface and/or with the user interface device, the at least one predicted text to the user such that, before the user text is input into the second machine learning algorithm, the user text can be updated by the user with the predicted text. The predicted text may help the user to find the right language to enter his problem in a way he understands it. The predicted text, however, need yet describe the fitting problem in terms that can only be understood by a hearing care specialist, such as the problem diagnosis text. For example, when the user enters "can't hear music", the predicted text may be "can't hear music in car" and/or "can't hear music in noisy environment" and/or "background music is too loud with regard to speech of my conversation partner".

The two step approach, in which a user text is firstly translated into one or more predicted texts and the predicted text is secondly translated into one or more problem diagnosis texts and/or one or more fitting solutions, has several advantages. The second machine learning algorithm for determining the at least one problem diagnosis text can be trained more easily and may be optimized better to predict more exact results. The same applies to the first machine learning algorithm for determining the at least one predicted text. Furthermore, the fitting problems are provided in a human-readable form during the method, which opens the possibility that the user and/or the hearing care professional can narrow down the problem and the list of possible fitting solutions can be narrowed.

According to an embodiment, the method further comprises: applying the at least one fitting solution to the hearing device modifying the fitting into an optimized fitting. It may be that the fitting solutions determined with the method are automatically applied to the hearing device or that the user selects one of the fitting solutions, which is then applied to the hearing device. Here, "applying" may mean that the user interface device, such as the mobile device, sends data to the hearing device, which encodes, how the fitting of the hearing device should be modified and that the fitting in the hearing device is changed accordingly. The changed fitting is then the optimized fitting.

The fitting solution may comprise data encoding, how to modify the sound processing parameters of the fitting into sound processing parameters of the optimized fitting. This data may be sent to the hearing device.

It also may be that after applying the fitting solution to the hearing device, the user is asked via the user interface, whether his or her problem is solved. When the answer is "no", then the optimized fitting may be replaced by the original fitting or by another fitting solution provided by the second machine learning algorithm.

According to an embodiment, the method further comprises: presenting the at least two predicted texts to the user, such that the user can select one of the predicted texts. The predicted texts may be shown to the user for confining his problem. More than one predicted text may be shown as a list to the user and the user may select one item from the list to narrow his problem. Solely the selected predicted text may be used for determining a problem diagnosis text and/or a fitting solution.

According to an embodiment, the method further comprises: presenting the problem diagnosis text and/or the fitting solution to a hearing care professional, such that the hearing care professional can apply an optimized fitting to the hearing device based on the problem diagnosis text and/or the fitting solution. It may be that every time when the user wants to comment on the actual hearing situation, a user text is input by him or her and stored in the user interface device. The user text then also may be timestamped and optionally additionally data, such as the current position of the user, his current activity, current sensor data of the hearing data, etc., which is collected at the same time point and/or time period, as the timestamp, is saved together with the user text.

At a later time, for example, when the user is at the office of the hearing care professional, the collected user texts, the determined problem diagnosis texts and determined fitting solutions may be presented to the hearing care professional, e.g., via a graphical user interface. The problem diagnosis texts and/or the fitting solutions may be selectable by the hearing care professional, e.g., via the graphical user interface. Here also a selected fitting solution may be applied to the hearing device. It also may be that after applying the fitting solution to the hearing device, the hearing care professional can rate via the user interface, whether the problem of the user is solved. When the answer is "no", then the optimized fitting may be replaced by the original fitting. This data also may be used for training the first and/or second machine learning algorithm.

According to an embodiment, a plurality of problem diagnosis texts and/or fitting solutions are determined for solving the problem indicated by the user text. The method then further comprises: presenting the plurality of problem diagnosis texts and/or fitting solutions to the user and/or a hearing care professional in a selectable format from which at least one problem diagnosis text and/or fitting solution can be selected.

According to an embodiment, the method further comprises: training the (second) machine learning algorithm for determining the problem diagnosis text and/or fitting solution and/or a (first) machine learning algorithm for determining the at least one predicted text with the selected problem diagnosis texts and/or selected fitting solutions and/or the optimized fittings. Predicted texts, problem diagnosis texts and fitting solutions, that result in a successful optimized fitting may be used for further training the machine learning algorithm. A fitting may be rated as successful based on user input, for example, the user may affirmed that the solution solved his or her problem. It has to be noted that data of a plurality of users and/or hearing care professionals may be used for collecting data that is used for training.

The same applies to a machine learning algorithm, which performs the step of determining a fitting solution. Here also a new fitting solution generated by a hearing care professional may be included into the training data. This may be the case, when one of the automatically determined fitting solutions does not solve the problem of the user.

According to an embodiment, a problem diagnosis text and/or a fitting solution comprises an estimated usefulness value, indicating a likeliness of the problem diagnosis text and/or the fitting solution solving the fitting problem described by the user text. In this case, the (first) machine learning algorithm for determining the at least one predicted text outputs an estimated usefulness value for each predicted text, the estimated usefulness value indicating, whether the predicted text results in a problem diagnosis text and/or a fitting solution solving the problem described by the user text.

It may be that problem diagnosis texts and/or fitting solutions comprise and/or are associated with a probability value, which indicates, how successful their usage in general is, for example for the average of a plurality of users.

The estimated usefulness value of a predicted text may be estimated depending on the estimated usefulness value of the determined problem diagnosis texts and/or fitting solutions. For example, a high estimated usefulness value may be associated with a predicted text resulting in one fitting solution with a rather high probability and resulting in further fitting solutions with a rather low probability. The estimated usefulness value also may depend on the number of the determined problem diagnosis texts and/or fitting solutions. For example, a lower number may be more useful, i.e. results in a higher estimated usefulness value. The estimated usefulness value also may depend on an estimated impact of the problem diagnosis texts and/or fitting solutions. For example, a more perceptible fitting solution may result in a higher estimated usefulness value.

According to an embodiment, predicted texts generated by the (first) machine learning algorithm for determining the at least one predicted text are presented to the user ordered by the estimated usefulness values of the predicted texts. In such a way, the user is helped in selecting the fitting problem and possible problem diagnosis texts and/or fitting solutions with the highest likelihood of solving his or her problem.

According to an embodiment, the (first) machine learning algorithm for determining the at least one predicted text is trained with the estimated usefulness values of the problem diagnosis texts and/or the fitting solutions determined for the respective predicted texts. It may be that, when estimated usefulness values are used, the second machine learning algorithm for determining the problem diagnosis texts and/or fitting solutions is trained in first step. Then, the first machine learning algorithm for determining the at least one predicted text is trained in a second step and in this second step, the training is also based on the output of the second machine learning algorithm, from which the estimated usefulness value of the problem diagnosis texts and/or the fitting solutions is determined and used for training the first machine learning algorithm.

According to an embodiment, the estimated usefulness value comprises at least one of: a likeliness value determined by the (second) machine learning algorithm for determining the problem diagnosis text and/or the fitting solution, wherein the likeliness value indicates a likeliness that the determined problem diagnosis text and/or the fitting solution can be attributed to the user text; a number of different problem diagnosis texts and/or fitting solutions determined by the (second) machine learning algorithm for determining the at least one problem diagnosis text and/or fitting solution, wherein a smaller number indicates a larger estimated usefulness value; and/or an estimated impact of the problem diagnosis text and/or fitting solution determined by the (second) machine learning algorithm for determining the at least one problem diagnosis text and/or fitting solution on a hearing perception of the user when the sound processing parameters of the fitting are modified in accordance with the problem diagnosis text and/or fitting solution.

According to an embodiment, further data from the hearing device and/or the user interface device is input into the first and/or second machine learning algorithm. Other types of data, in particular beyond written text, may be input as well, for example technical information stored in the hearing device may be included.

According to an embodiment, the method further comprises: receiving a classification of the environmental sound processed by the hearing device, in particular when the user inputs the user text. The classification may be performed by the hearing device, which also may use the classification for selecting a sound program. The classification is then input into the (second) machine learning algorithm for determining the problem diagnosis text and/or fitting solution and/or into the (first) machine learning algorithm for determining the at least one predicted text presented to the user for updating the user text. Such classifications may include the type of sound processed by the hearing device, such as noise, speech or music, and/or a location of the user, such as in car, in a restaurant, and/or an activity of the user, such as watching TV, walking, running. Hearing device environment classification may be used to identify what acoustical environment the user is in. This may help to narrow down the determined predicted texts, problem diagnosis texts and/or fitting solutions.

According to an embodiment, the method further comprises: receiving sensor data of a sensor of the hearing device and/or the user interface device, the sensor data being acquired, in particular, when the user inputs the user text. The sensor data may comprise at least one of: accelerometer data, GPS data, vital data of the user, such as temperature, heartbeat, etc. The sensor data is input into the (second) machine learning algorithm for determining the problem diagnosis text and/or fitting solution and/or into the (first) machine learning algorithm for determining the predicted text presented to the user for updating the user text. Also these data may help to narrow down the determined predicted texts, problem diagnosis texts and/or fitting solutions.

According to an embodiment, the method further comprises: determining a wearing time of the hearing device. The wearing time is input into the (second) machine learning algorithm for determining the problem diagnosis text and/or fitting solution and/or into the (first) machine learning algorithm for determining the predicted text presented to the user for updating the user text. If the user text suggests statements regarding physical comfort and/or fit of the hearing device (for example such as “the earpiece is painful”) and the hearing device wearing time is comparable low, the determined fitting solution may provide a link to a training or counselling video (such as how to improve physical fit of the hearing device) and/or may suggest to make an appointment with a clinician.

According to an embodiment, the (second) machine learning algorithm for determining the at least one problem diagnosis text and/or fitting solution and/or the (first) machine learning algorithm for determining the at least one predicted text is an artificial neuronal network. Such an artificial neuronal network may be trained by back propagation. However, also other machine learning algorithms may be used. In particular, the machine learning algorithm for determining the at least one problem diagnosis text and/or fitting solution may be a decision tree or a support vector machine.

According to an embodiment, the user interface is provided by a user interface device, which is a mobile device carried by the user, for example a table computer or smartphone. The user interface may be a graphical user interface, into which the user can input the user text. The predicted texts, problem diagnosis texts and/or the fitting solutions may be displayed on the graphical user interface and/or may be selected with the graphical user interface.

According to an embodiment, the user interface is provided by the hearing device, for example may be controlled by speech commands. The user text may be generated by speech recognition from an audio stream generated by the user. The audio stream may be generated from sound acquired by the hearing device. The predicted texts and/or the problem diagnosis texts s may be output as sound to the user via the hearing device and/or may be selected by speech commands.

Further aspects relate to a computer program for determining a problem diagnosis text and/or a fitting solution and/or an optimized fitting of a hearing device, which, when being executed by at least one processor, is adapted to carry out the steps of the method as described in the above and in the following as well as to a computer-readable medium, in which such a computer program is stored.

For example, the computer program may be executed in the hearing device, a mobile device carried by the user and optionally a server in data communication with the mobile device. The computer-readable medium may be a memory of one or more of these devices.

In general, a computer-readable medium may be a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g., the Internet, which allows downloading a program code. The computer-readable medium may be a non-transitory or transitory medium.

A further aspect relates to a hearing system comprising a hearing device and an evaluation system. The evaluation system may be a mobile device in data communication with the hearing device and optionally a server device in data communication with the mobile device, for example via Internet. It is also possible that the evaluation system is a part of the hearing device.

The hearing device is adapted for providing processed sound to a user wearing the hearing device, wherein the hearing device receives environmental sound from an environment of the user, processes the environmental sound with a fitting into the processed sound and outputs the processed sound to the user, wherein the fitting comprises sound processing parameters, which are adapted to needs of the user.

The evaluation system is adapted for performing the remaining steps of the method, in particular for: receiving, via a user interface, a user text, input by the user, to indicate a problem of the user with the hearing device; and determining a problem diagnosis text and/or a fitting solution from the user text, the problem diagnosis text describing a possibility to modify the sound processing parameters of the fitting and/or a possibility to modify a component of the hearing device for solving the problem indicated by the user text and the fitting solution encoding modified sound processing parameters of the fitting applicable to the hearing device for solving the problem indicated by the user text, wherein the user text is input into a machine learning algorithm, which outputs the problem diagnosis text and/or the fitting solution, wherein the machine learning algorithm has been trained with user texts and corresponding problem diagnosis texts and/or fitting solutions solving the problem indicated by the user text, which have been collected in a database.

It has to be understood that features of the method as described in the above and in the following may be features of the computer program, the computer-readable medium and the hearing system as described in the above and in the following, and vice versa.

These and other aspects will be apparent from and elucidated with reference to the embodiments described hereinafter.

FIG. 1 schematically shows a hearing system 10, which comprises a hearing device 12, a mobile device 14, a server device 16 and a fitting device 18.

The hearing device 12, which usually comprises a pair of ear devices, is worn by a user, for example behind the ear and/or in the ear. The hearing device 12 may be a hearing aid. With a microphone, the hearing device 12 acquires a sound signal from the environment, processes the sound signal based on a fitting, which has been adapted to the needs of the user, and outputs the processed sound signal to the user, for example via a loudspeaker.

The mobile device 14, which is carried by the user, may be a smartphone or a tablet computer. The mobile device 14 may be in data communication with the hearing device 12, for example via Bluetooth.

Optionally, the hearing system 10 comprises the server device 16, which is in data communication with the mobile device 14 via Internet 19. Some steps or parts of the method described herein may be performed in the server device 16. However, these steps also may be performed by the mobile device 14 or even the hearing device 12.

As a further option, the hearing system 10 comprises a fitting device 18, which may be a PC or other computing device in an office of a hearing care professional. When the user and the hearing device 12 is in this office, the fitting device 18 may be in data communication with the hearing device 12 via Bluetooth. It also may be that the fitting device 18 is in data communication with the mobile device 14, for example via Internet 19, even when the user is not at the office of the hearing care professional.

The devices 14, 16 and/or 18 may be seen as an evaluation and fitting system 20. As described below, usually during the operation of the hearing device 12, the user may enter a user text into the evaluation system 20, which then processes the text, provides further information to the user, such as predicted texts, and optionally optimizes the fitting of the hearing device 12.

The server device 16 may comprise a database 21, which stores information for training specific machine learning algorithms, which are used by the evaluation and fitting system 20 for optimizing the fitting of the hearing device 12.

Figure 2:
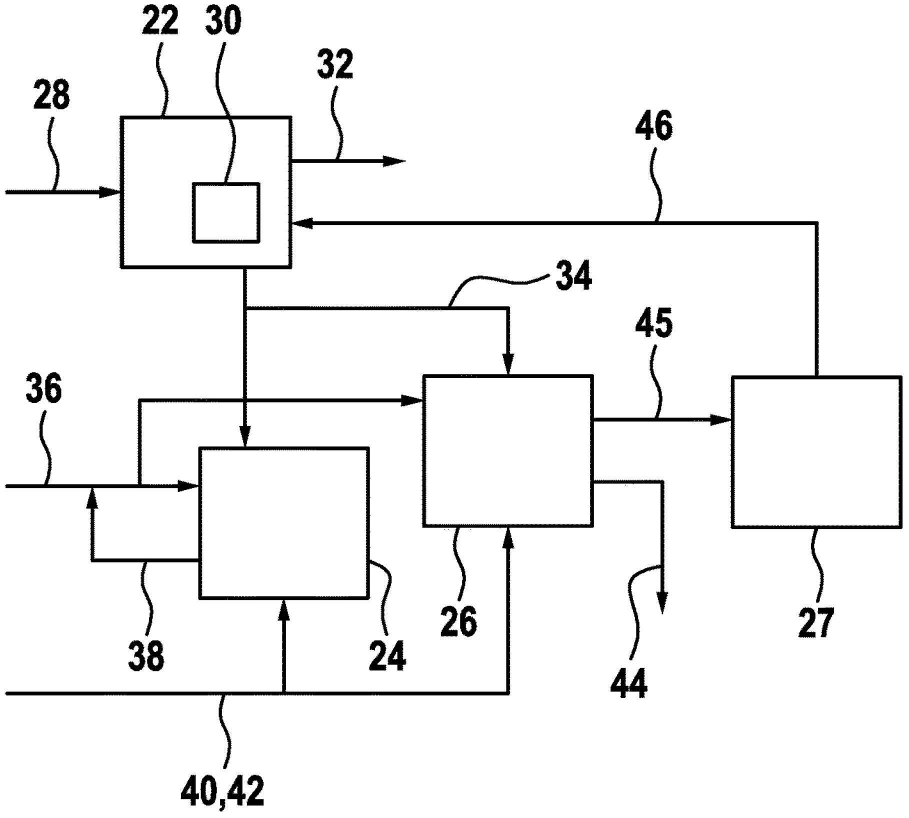
FIG. 2 schematically shows parts of the hearing system of FIG. 1.

FIG. 2 shows parts of the hearing system 10, in particular a sound processor 22, a first machine learning algorithm 24, a second machine learning algorithm 26, and a fitting module 27.

The sound processor 22, which may be part of the hearing device 12 and/or the mobile device 14, receives a data stream generated from environmental sound 28, which may be provided by the microphone of the hearing device 12. Based on fitting parameters of a current fitting 30, the sound processor 22 processes the sound 28 into a processed sound 32, which is output to the user. The fitting parameters of the fitting 30 encode, how the sound processor 22 processes the sound, for example by adjusting a gain of the sound in a frequency dependent way, suppressing noise, etc.

The sound processor 22 also may generate a classification 34 of the sound 28, which classification may influence the sound processing. For example, a classification 34 may indicate that the sound 28 has high noise components and noise suppression may be intensified. The sound classification 34 also may be provided as input to the machine learning algorithms 24, 26.

The first machine learning algorithm 24 receives a user text 36, which has been input by the user into the mobile device 14. The user text 36 describes a problem of the user with the hearing device 12 from the point of view of the user. A user interface device interacting with the user may be the mobile device 14 carried by the user. In this case, the user interface may be a graphical user interface.

It also may be that the user produces an audio stream via the hearing device 12 and/or the mobile device 14, in which audio stream he or she describes the user problem. The audio stream then is transformed into the user text 36. The hearing device 12 may be a user interface device interacting with the user and the user text 36 may be generated by speech recognition from an audio stream generated by the user.

From the user text 36, the first machine learning algorithm 24 determines at least one predicted text 38. The predicted text 38 is provided and/or shown to the user and the user may select the predicted text 38 as new and/or modified user text 36. A plurality of the predicted texts 38 may be shown to the user, for example in the form of a select box, and the user may select one of the plurality predicted texts 38. It is possible that the user modified the predicted text 38 for generating a new user text 36.

It may be that not only the user text 36 is input into the first machine learning algorithm 24, but also the classification 34 and/or the further data 40, 42, such as sensor data 40 acquired by the hearing device 12 and/or the mobile device 14. Also internal data 42, such as configuration data or a wearing time of the hearing device may be used as further input to the first machine learning algorithm 24.

The first machine learning algorithm 24 for determining the at least one predicted text 38 may be a neuronal network, which has been trained with data from the database 21 (see below).

The second machine learning algorithm 26 also receives the user text 36 (which may have been replaced by the predicted text 38) and determines at least one problem diagnosis text 44 and/or at least one fitting solution 45 from the user text 36.

The problem diagnosis text 44 describes a problem of the fitting 30 in the language of a hearing care professional or specialist and may be provided to such a person.

The fitting solution 45 encodes a modification of the fitting 30 for solving the respective fitting problem described by the user text 36 and more sophisticated by the problem diagnosis text 44. Again, it may be that not only the user text 36 is input into the first machine learning algorithm 24, but also the classification 34 and/or the further data 40, 42, such as sensor data 40 acquired by the hearing device 12 and/or the mobile device 14. Also internal data 42, such as configuration data or a wearing time of the hearing device, may be used as further input to the second machine learning algorithm 26.

The second machine learning algorithm 26 for determining the at least one problem diagnosis text 44 and/or fitting solution 45 may be a neuronal network, which has been trained with data from the database 21 (see below).

The fitting solution 45 may be in a form that it can be directly applied to the hearing device 12. It also may be that the fitting solution 45 additionally contains information in human-readable form, how to fit the hearing device 12 to overcome the user problem. As shown in FIG. 2, the fitting solution 45 may be input into a fitting module 27, which automatically generates an optimized fitting 46 from the fitting solution 45. The optimized fitting 46 then may be directly applied to the hearing device 12.

Figure 3:
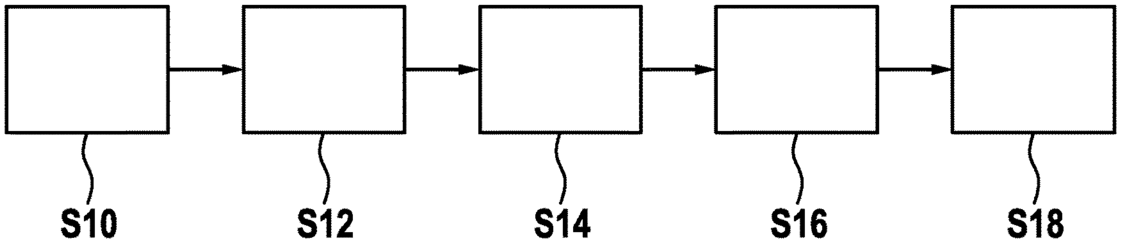
FIG. 3 shows a flow diagram for a method for determining an optimized fitting of a hearing device according to an embodiment.

FIG. 3 shows a flow diagram for a method for determining the problem diagnosis text 44, the fitting solution 454 and the optimized fitting 46 for the hearing device 12. The method may be performed with the hearing system 10 shown in FIG. 1 and in particular with the components and/or modules of the fitting system shown in FIG. 2.

In step S10, the sound processor 22 provides processed sound 32 to the user wearing the hearing device 12. The hearing device 12 receives environmental sound 28 from an environment of the user, processes the environmental sound 28 with the fitting 30 into the processed sound 32 and outputs the processed sound 32 to the user. As will be described in the following, whenever the user has a problem with the processed sound 32 and/or with the hearing device 12, he or she can input a user text 36 into the evaluation system 20, which will generate a problem diagnosis text 44, a fitting solution 45 and/or an optimized fitting 46. The current fitting 30 as well as the optimized fitting comprises sound processing parameters, which control the processing of the sound 28. With the fitting solution 45, these parameters can be adapted, such that the optimized fitting is better adapted to the needs of the user compared to the original fitting 30.

In step S12, the evaluation system 20 and in particular, the first machine learning algorithm 24 receives the user text 36. The user text 36 has been input by the user into the user interface device 12, 14. As already mentioned, the user text 36 indicates a problem of the user with the fitting 30 of the hearing device 12.

In optional step S14, the first machine learning algorithm 24 determines at least one predicted text 38 For example, the user starts typing a description of a problem and experiences an auto-correct function, in which the predicted text 38 replaces the user text 36. The first machine learning algorithm 24 also may predict a text a user can enter. For example, the first machine learning algorithm 24 may autocomplete the user text 36 into a more detailed problem diagnosis text 38.

As a further example, the user may get suggestions regarding how to describe listening problems, for example in the form of a select box and/or a drop down box, which displays the determined predicted texts 38. This may be useful for people who cannot find the words for their problem. This may increase user friendliness and may facilitate text writing for people with dyslexia.

It is important that the primary goal of the first machine algorithm 24 is not yet to predict one or more detailed problem diagnosis texts 44 and/or fitting solutions 45 from which the user can select. Only a text 38 is determined, which can be related to a "problem identification and detailed fitting solution" stage later on (i.e. step S16). The predicted text 38 may still be ambiguous with regard to a fitting solution 45. In particular, the predicted text 38 may be related to several or none fitting solution 44.

In step S16, the second machine learning algorithm 26 determines at least one problem diagnosis text 44 and/or fitting solution 45 from the user text 36, which may have been replaced by the user with the predicted text 38.

For the user text 36, one or more problem diagnosis texts 44 and/or one or more fitting solutions 45 may be provided and/or displayed to the user or a hearing care professional. The user or the hearing care professional may get a multiple choice overview of different potential fitting solutions 45 that may solve the problem of the user.

In a first iteration, the machine learning algorithm 24 has been trained with user texts 36, which have been collected in a database 21 and the second machine learning algorithm 26 has been trained with user texts 36, problem diagnosis texts 38 and fitting solutions 45, which have been collected in a database 21.

The training data set in the database 21 can be collected by asking hearing device users about their problems and storing the answers together with information provided by hearing care professionals, how they identified the problem and with which fitting modifications they solved it.

In particular, the applicant owns a dataset of hearing aid users, who have described their experiences with hearing devices in real time, close to or exactly in the moment, when they were experiencing them as part of their daily lives, and in their own words. The data were collected using a particular feature of a mobile app. The data collection relied on the principles of "ecological momentary assessment" or EMA. EMA is a data collection technique where people provide feedback in real-life close to or during the actual experience by responding to (typically very short) questionnaires. The technique is aimed at overcoming memory bias. The dataset was collected across a period of 3 years, resulting in a dataset of 9000 ratings in English and of a certain length, i.e., at least 30 characters.

Figure 4:
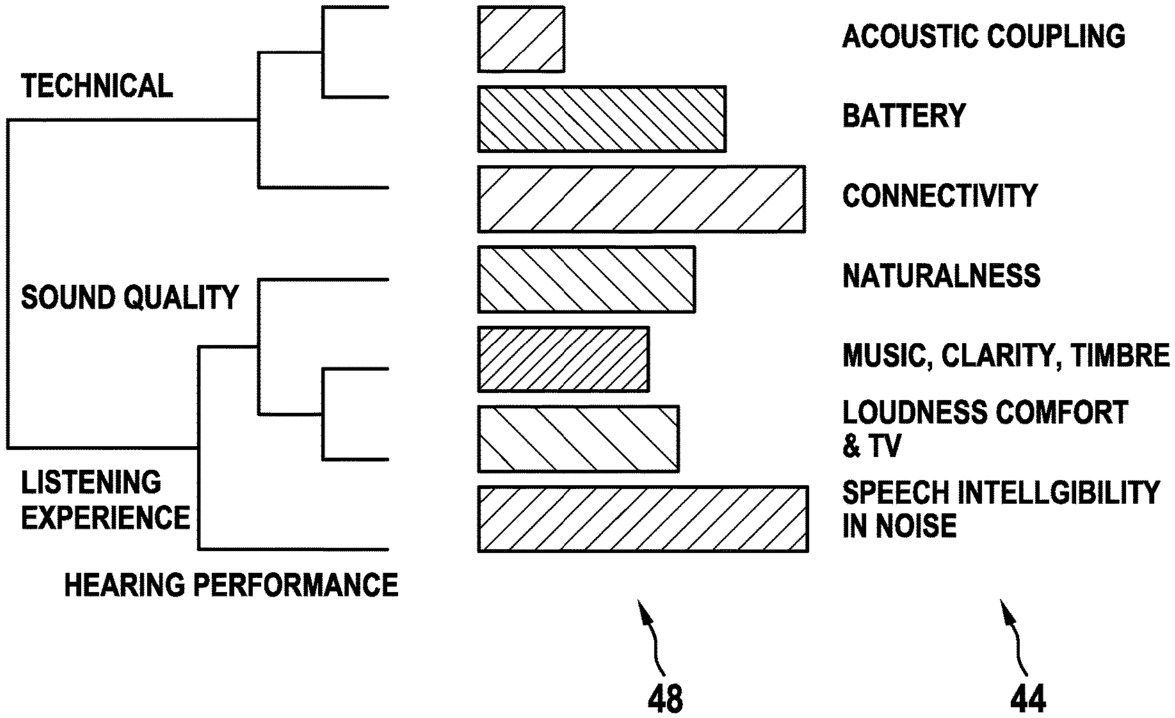
FIG. 4 shows a diagram with problem diagnosis texts produced with the method of FIG. 3.

As an example FIG. 4 shows problem diagnosis texts 44 that have been produced by the user text "music to loud" with a correspondingly trained machine learning algorithm 26. FIG. 4 furthermore shows estimated usefulness values 48 for the problem diagnosis texts 44, see below. Optionally, one or more suitable fitting solutions 45 may be produced with the algorithm 26 in addition or instead of the problem diagnosis texts 44. As illustrated, the trained machine learning algorithm 26 may attribute the user text 36 to a variety of different problem diagnosis texts 44 (and/or fitting solutions 45) with a different probability of correspondence to the problem indicated by the user text 36. In this regard, the problem diagnosis texts 44 and/or fitting solutions 45 may be regarded as different classes for which the machine learning algorithm 26 has been trained to classify the entered user text 36. E.g., the problem diagnosis texts 44 and/or fitting solutions 45 may be presented to the user of the hearing device and/or to a hearing care professional.

In the illustrated example, the problem diagnosis texts 44 correspond to different topics, e.g., keywords, allowing to relate the entered user text 36 to a specific modification of the hearing device 12 in order to solve the problem indicated by the user text 36. Some problem diagnosis texts 44, e.g., acoustic coupling, battery, connectivity, may relate the user text 36 to a (physical) modification of a component of the hearing device. Some other problem diagnosis texts 44, e.g., naturalness, music, clarity, timbre, loudness comfort & TV, speech intelligibility in noise, may relate the user text 36 to a modification of the sound processing parameters of the fitting. For the latter category of problem diagnosis texts 44, fitting solutions 45 may also be produced.

When training the machine learning algorithm 26, a dataset comprising pre-existing user-texts may be labelled with different classes, in particular topics, which correspond to the problem diagnosis texts 44 and/or fitting solutions 45. In this way, a topic-modelling of the dataset may be performed. The classes may be selected with various gradations. In the example illustrated in FIG. 4, a rather crude gradation between the classes may be to distinguish between a first class relating the user text 36 to a technical problem, which can be solved by a modification of a component of the hearing device, and a second class relating the user text 36 to an improvement of the user's listening experience, which can be solved by a modification of the sound processing parameters of the fitting. In a more refined gradation of the classes, the user's listening experience may be further distinguished between the sound quality and the hearing performance. In an even more refined gradation of the classes, the technical problem may be distinguished in between the topics including acoustic coupling, battery and connectivity. The sound quality may be further distinguished between naturalness, music, clarity, timbre, loudness comfort & TV, and the hearing performance may be related to the speech intelligibility in noise. Further refinements of the gradation of the classes is conceivable. E.g., various speech profiles and/or noise sources may be distinguished when relating the user text 36 to the speech intelligibility in noise.

As illustrated, in such a topic-modelling of the dataset, an increasing refinement of the classes may be represented by a tree diagram comprising an increasing number of branches related to the increasing number of classes. To further facilitate the identifying of an appropriate modification of the hearing device for the hearing care professional and/or the user, the problem diagnosis texts 44 produced with the algorithm 26 may attribute the user text 36 to one or more of the branches of the tree. For instance, when the classes attributed to the user text 36 by the algorithm 26 comprise naturalness, the produced problem diagnosis texts 44 may include the information that the user's problem can be related to the particular branch of the listening experience, more particularly to the sound quality, and even more particularly to the naturalness.

As already mentioned with respect to FIG. 2, not only the respective text may be input into the respective machine learning algorithms 24, 26 in steps S14 and S16, but also further data useful for identifying the situation in which the user is.

In steps S14 and S16, a classification 34 of the environmental sound 28 processed by the hearing device 12 may be generated by the sound processor 22. The classification 34 may be made of environmental sound 28, which was acquired during the time, when the user inputs the user text 36. The classification 34 is then input into the first machine learning algorithm 24 for determining the at least predicted text 38 and/or into the second machine learning algorithm 26 for determining the at least one problem diagnosis text 44 and/or fitting solution 45.

In steps S14 and S16, also sensor data 40 of a sensor of the hearing device 12 and/or the mobile device 14 may be input into the first machine learning algorithm 24 for determining the at least one predicted text 38 and/or into the second machine learning algorithm 26 for determining the at least one problem diagnosis text 44 and/or fitting solution 44. The sensor data is acquired during the time, when the user inputs the user text 36. For example, the sensor data 40 comprises at least one of: accelerometer data, GPS data, vital data of the user.

As a further example, in steps S14 and S16, a wearing time 42 of the hearing device 12 is determined, which is input into the first machine learning algorithm 24 and/or into the second machine learning algorithm 26.

In optional step S18, the at least one fitting solution 45 is applied to the hearing device 12 and the fitting 30 is modified into an optimized fitting 46. The fitting solution 45 comprises data encoding, how to modify the sound processing parameters of the fitting 30 into sound processing parameters of the optimized fitting 46. In this case, the fitting solution 45 may comprise the optimized fitting 46 and may be directly applied to the hearing device 12. As described with respect to FIG. 2, the information in the fitting solution 45 may be translated into the optimized fitting 46 by fitting module 27.

As a further option, the optimized fitting 46 may be determined by a hearing care professional, who interprets the problem diagnosis text 44.

As an example, in step S18, the user is provided with the different fitting solutions 45 by the user interface device 12, 14. In this case, the fitting solution 45 also may comprise a description of what would be changed, when the fitting solution is applied to the hearing device 12. The user then selects what he wants to have solved and the selected fitting solution 45 (or optionally the optimized fitting determined by the fitting module 27) is applied to the hearing device 12.

Figure 5:
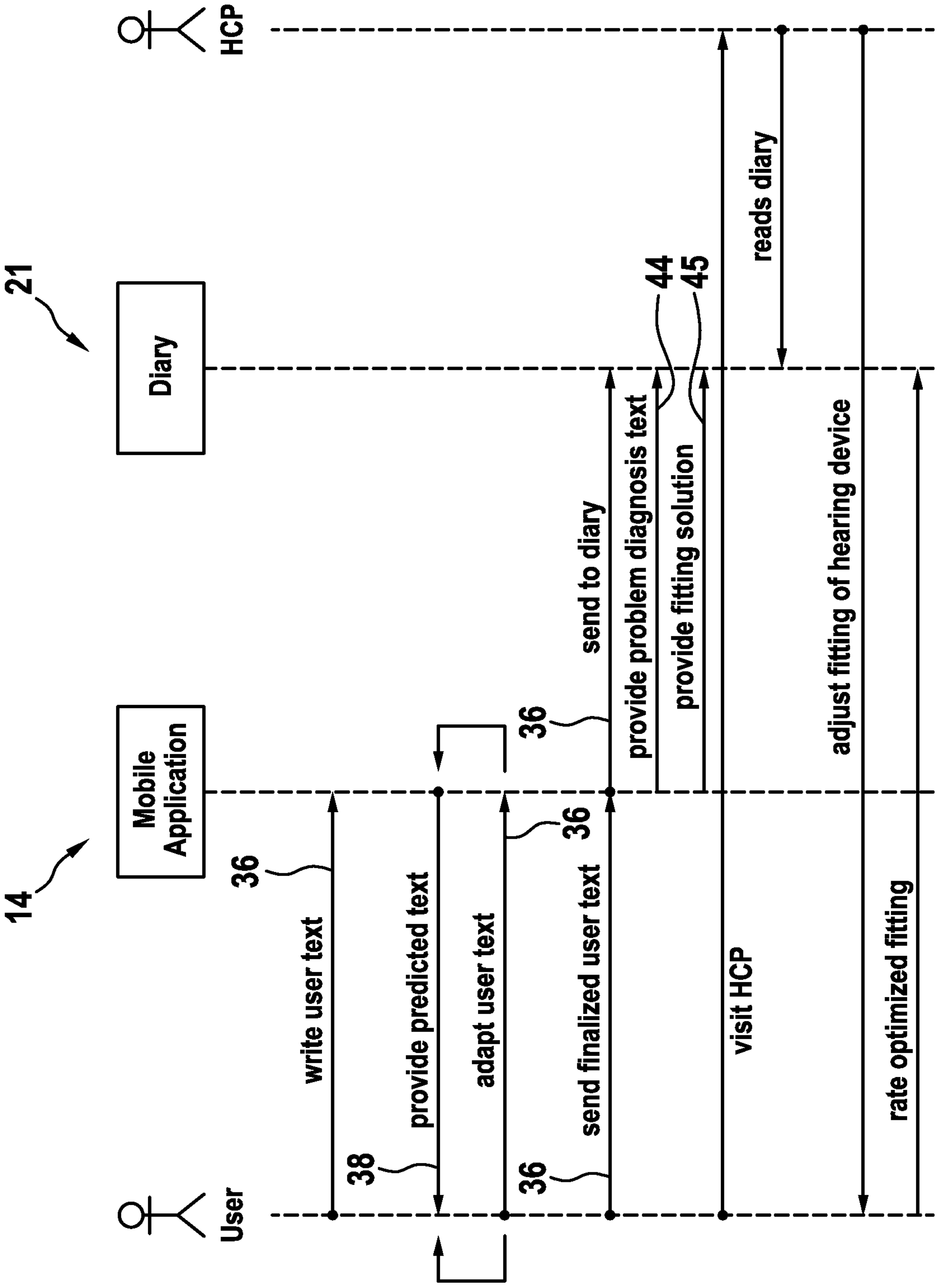
FIG. 5 shows a flow diagram for a method for determining an optimized fitting of a hearing device according to an embodiment.
Figure 6:
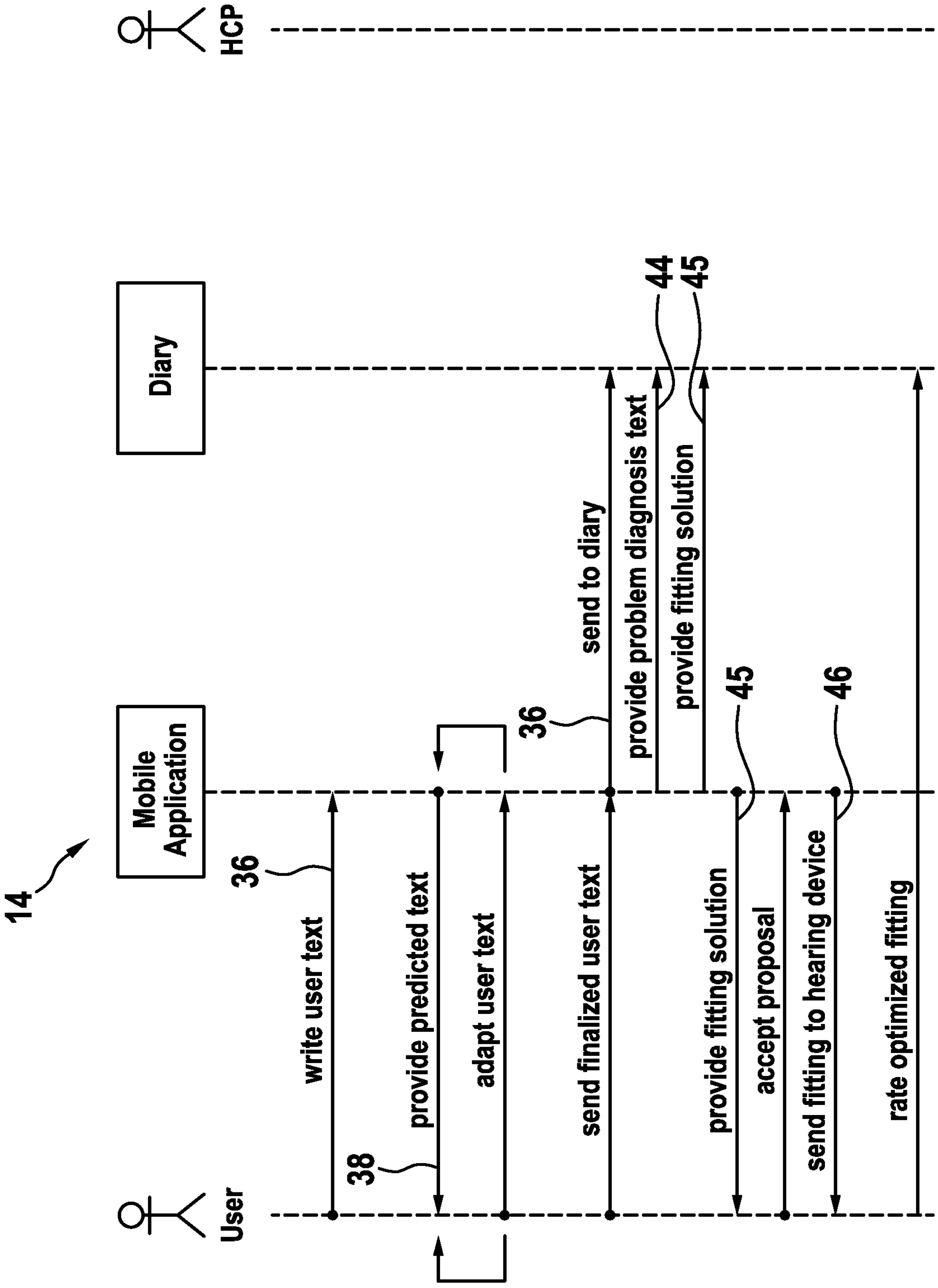
FIG. 6 shows a flow diagram for a method for determining an optimized fitting of a hearing device according to an embodiment.

FIGS. 5 and 6 show examples, how the method may be implemented. In these two examples, the user interface is a “Mobile Application” run in the mobile device 14. Part of the collected data is in a “Diary”, which may be part of the database.

In the example shown in FIG. 5, the hearing care specialist HCP is involved, in the example of FIG. 6 not.

In both FIG. 5 and FIG. 6, the user writes a textual feedback and inputs the user text 36 into the Mobile Application. The Mobile Application, which comprises the first machine learning algorithm 24, generates predicted texts 38, which are provided to the user, who can adapt or augment the initial user text 36 accordingly. For example, this may be done by selecting a proposed predicted text 38. The generation of the feedback text in the form of a predicted text 38 may be done iteratively. In the end, the finalized user text 36 is sent to the diary.

FIG. 4 shows that the Mobile Application also comprises the second machine learning algorithm 26, which generates the problem diagnosis text 44 and optionally the fitting solution 45, which are also sent to the Diary and saved there.

In the method of FIG. 4, the information of the user is logged in the Diary, before the user visits the hearing care professional. The hearing care professional reads the Diary and analyses and uses this information during the next appointment of the user to provide further fine-tuning to the fitting 30 of the hearing device 12 with very targeted information, which will be free from memory bias of the user. The information may be displayed on the fitting device 18 (see FIG. 1).

In particular, the hearing care professional can adjust the fitting 30 by choosing one or more fitting solutions 45 stored in the Diary. The hearing care professional also can adjust the fitting 30 manually with the fitting device 18 based on the problem diagnosis text 44.

After the visit of the hearing care professional, the user also can rate the optimized fitting, which rating is also stored in the Diary.

In the example of FIG. 4, the user texts 36, the problem diagnosis texts 44 and optionally the fitting solutions 45 are collected and presented to the hearing care professional, such that the hearing care professional can select problem diagnosis texts 44 and/or fitting solutions 45 to determine optimized fittings. The problem diagnosis texts 44 and/or the fitting solutions 45 may also be presented directly to the user, e.g., when the user intends to find a solution of the problem associated with the user text on his own.

In FIG. 4, the “technical” branch may also deal with possible modifications of hearing device components. For example “acoustic coupling” may refer to choosing a different housing shape of the earpiece, which may be determined based on an individual ear impression or another elastic seal around the housing, so that the earpiece fits better in the ear canal or is better positioned for the sound output in the ear canal. “Connectivity” may be both the (usual wireless) connection of two hearing devices with each other as well as the connection to an external device, such as a mobile phone or an external microphone (for example a table microphone). A component to be added, exchanged or removed may be a wax guard, i.e. an earwax filter, which is usually placed in front of the loudspeaker speaker output or the microphone input and which usually also has an impact on the sound reproduction.

The “listening experience” branch in general deals with possible fitting changes of the fitting parameters, in which, for example, a distinction can be made between changes in “sound quality” and “hearing performance”.

Contrary to this, in FIG. 5, possible fitting solutions 45 are presented to the user, such that the user can select one of the fitting solutions 45. The user selects one of the fitting solutions 45 and the corresponding optimized fitting 46 is applied to the hearing device 12. The user can try out a fitting solution 45 as proposed by the Mobile Application, and even compare his experience with the suggestion “on” versus “off”.

After that, the user immediately can rate the optimized fitting 46, which rating is also stored in the Diary.

The user text 36, the selected fitting solution 45 stored in the Diary and the rating of the user stored in the Diary may be used for further training the machine learning algorithm 24 and 26.

For example, initially the machine learning algorithm 24 may be trained on a large text corpus and then can be fine-tuned only based on previous user texts (in which a user complains about a fitting or hearing problem), without any relation to a possible fitting solution. In particular, the training data of the machine learning algorithm 24 may then be labelled with regard to the (most likely) text that would be suggested to the user based on his (preliminary) text input (or autocompleted when the user starts typing), e.g., the texts previously entered during “send feedback text” in FIGS. 4 and 5.

For helping the user in choosing a fitting solution 45, the fitting solution 45 may comprise an estimated usefulness value, indicating a likeliness of the fitting solution 45 solving the fitting problem described by the user. The second machine learning algorithm 26 then may output an estimated usefulness value for each fitting solution 45. Fitting solutions 45 may be presented to the user ordered according to the estimated usefulness value. Also corresponding problem diagnosis texts 44 may be provided with this estimated usefulness value.

For helping the user in choosing a predicted text 38, the first machine learning algorithm 24 then can also be trained based on user texts 36, which are, however, labelled and/or correlated and/or weighted by the estimated usefulness values of the fitting solutions predicted by the second machine learning algorithm 26.

In this case, the first machine learning algorithm 24 outputs an estimated usefulness value 48 (see FIG. 3) for each predicted text 38 indicating, whether the predicted text 38 results in fitting solutions 45 solving the fitting problem described by the predicted text 38. Predicted texts 38 may be presented to the user ordered according to the estimated usefulness value 48.

The estimated usefulness value may comprise one or more parameters.

For example, the estimated usefulness value may be based on a probability for the fitting solutions 45, which probability value estimates a success of the fitting solutions 45 and/or which probability value is predicted by the second machine learning algorithm 26. For example, if one fitting solution 45 has a rather high probability and the remaining fitting solutions 45 have a rather low probability, this would indicate a rather high estimated usefulness value for the corresponding predicted text 38.

As a second example, the estimated usefulness value may be a number of the problem diagnosis texts 44 and/or the fitting solutions 45, which are predicted by the second machine learning algorithm 26. A lower number may indicate a higher estimated usefulness value.

As a third example, the estimated usefulness value may be an estimated impact, which the fitting solutions 45 predicted by the second machine learning algorithm 26 may have. A more perceptible fitting solution 45 or a fitting solution 45, which has been proven to be generally more successful than others, may indicate a higher estimated usefulness value.

This may imply, that the second machine learning algorithm 26 may be trained first, and the first machine learning algorithm 24 will then be trained by additionally labelling the training data of the first machine learning algorithm 24 by the predictions made by the second machine learning algorithm 26. This training data may comprise user texts 36, in which the user complains about a fitting or hearing problem. The training data of the first machine learning algorithm 24 may also be labelled with regard to the (most likely) predicted texts 38 that would be suggested to the user based on his (preliminary) text input.

During the training of the first machine learning algorithm 24, all the labels of the training data may need to run through the second machine learning algorithm 26 first to provide for the additional labelling of this training data, and the additionally labelled training data can then be used to train the first machine learning algorithm 24.

When the evaluation system 20 is normally operated, the training of the first machine learning algorithm 24 may continue after each prediction made by the second machine learning algorithm 26.

In any case, the training of the second machine learning algorithm 26 may continue each time the user or hearing care professional selects one of the predicted problem diagnosis texts 44 and/or fitting solutions 45, wherein the selected problem diagnosis text 44 and/or fitting solution 45 is used to label the new training data.

There are further options for improving the quality of the training data. Stopwords may be removed in the training dataset, for example based on existing libraries of stopwords. Infrequent words in the training dataset may be removed and very frequent terms may be downsampled. A sentiment analysis may be performed to remove statements describing positive experiences.

While the embodiments described herein have been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 hearing system
12 hearing device
14 mobile device
16 server device
18 fitting device
19 Internet
20 evaluation and fitting system
21 database
22 sound processor
24 first machine learning algorithm
26 second machine learning algorithm
27 fitting module
28 environmental sound
30 current fitting
32 processed sound
34 classification
36 user text
38 predicted text
40 sensor data
42 internal data
44 problem diagnosis text
45 fitting solution
46 optimized fitting
48 estimated usefulness value

What is claimed is:

1. A method for determining a problem diagnosis text and a fitting solution for a hearing device, the method comprising:

providing processed sound to a user wearing the hearing device, wherein the hearing device receives environmental sound from an environment of the user, processes the environmental sound with a fitting into the processed sound and outputs the processed sound to the user, wherein the fitting comprises sound processing parameters adapted to needs of the user;

receiving, via a user interface, a user text, input by the user, to indicate a problem of the user with the hearing device;

determining the problem diagnosis text and the fitting solution from the user text, the problem diagnosis text describing at least one of a possibility to modify the sound processing parameters of the fitting or a possibility to modify a component of the hearing device for solving the problem indicated by the user text, the fitting solution including data encoding modified sound processing parameters of the fitting applicable to the hearing device for solving the problem indicated by the user text;

wherein the user text is input into a machine learning algorithm that outputs the problem diagnosis text and the fitting solution, wherein the machine learning algorithm has been trained with user texts and corresponding problem diagnosis texts and fitting solutions solving the problem indicated by the user text;

wherein the method further comprises sending the data included in the fitting solution to the hearing device, the data configured to apply the fitting solution to the hearing device.

2. The method of claim 1,
wherein the machine learning algorithm is a second machine learning algorithm, and the method further comprises:
determining at least one predicted text from the user text, wherein the user text is input into a first machine learning algorithm, which outputs the at least one predicted text, wherein the first machine learning algorithm has been trained with user texts and corresponding predicted texts, which have been collected in a database;
presenting the at least one predicted text to the user such that, before the user text is input into the second machine learning algorithm, the user text can be updated by the user with the predicted text.

3. The method of claim 1, further comprising presenting, within a user interface, the problem diagnosis text and the fitting solution.

4. The method of claim 1,
wherein a plurality of problem diagnosis texts and fitting solutions are determined for solving the problem indicated by the user text;
the method further comprising:
presenting the plurality of problem diagnosis texts and fitting solutions to a hearing care professional in a selectable format from which at least one problem diagnosis text or fitting solution can be selected.

5. The method of claim 4, further comprising:
training at least one of the machine learning algorithm for determining the problem diagnosis text and the fitting solution or an additional machine learning algorithm for determining at least one predicted text with the selected problem diagnosis texts and the selected fitting solutions.

6. The method of claim 2,
wherein the fitting solution comprises an estimated usefulness value that indicates a likeliness of the fitting solution solving the fitting problem described by the user text;
wherein the machine learning algorithm for determining the at least one predicted text outputs an estimated usefulness value for each predicted text indicating, whether the predicted text results in a particular fitting solution solving the problem indicated by the user text.

7. The method of claim 6,
wherein predicted texts generated by the machine learning algorithm for determining the at least one predicted text are presented to the user ordered by the estimated usefulness values of the predicted texts; and
wherein the machine learning algorithm for determining the at least one predicted text is trained with the estimated usefulness values of the fitting solutions determined for the respective predicted texts.

8. The method of claim 6,
wherein the estimated usefulness value comprises at least one of:
a likeliness value determined by the machine learning algorithm for determining the the fitting solution, wherein the likeliness value indicates a likeliness that the fitting solution can be attributed to the user text;
a number of different fitting solutions determined by the machine learning algorithm for determining the fitting solution, wherein a smaller value for the number indicates a larger estimated usefulness value; or
an estimated impact of the fitting solution determined by the machine learning algorithm on a hearing perception of the user when the sound processing parameters of the fitting are modified in accordance with the fitting solution.

9. The method of claim 1, further comprising:
receiving a classification of the environmental sound processed by the hearing device, when the user inputs the user text;
wherein the classification is input into the machine learning algorithm for determining the problem diagnosis text and the fitting solution.

10. The method of claim 1, further comprising:
receiving sensor data of a sensor of at least one of the hearing device or the user interface device, the sensor data being acquired when the user inputs the user text;
wherein the sensor data is input into the machine learning algorithm for determining the problem diagnosis text and the fitting solution.

11. The method of claim 1, further comprising:
determining a wearing time of the hearing device;
wherein the wearing time is input into the machine learning algorithm for determining the problem diagnosis text and the fitting solution.

12. The method of claim 1,
wherein the user interface device is a mobile device carried by the user and the user interface is a graphical user interface; or
wherein the user interface is provided by the hearing device and the user text is generated by speech recognition from an audio stream generated by the user.

13. A hearing system comprising a hearing device and an evaluation system,
wherein the hearing device is adapted for providing processed sound to a user wearing the hearing device, wherein the hearing device receives environmental sound from an environment of the user, processes the environmental sound with a fitting into the processed sound and outputs the processed sound to the user, wherein the fitting comprises sound processing parameters adapted to needs of the user;
wherein the evaluation system is adapted for:
receiving, via a user interface, a user text, input by the user, to indicate a problem of the user with the hearing device;
determining a problem diagnosis text and a fitting solution from the user text, the problem diagnosis text describing at least one of a possibility to modify the sound processing parameters of the fitting or a possibility to modify a component of the hearing device for solving the problem indicated by the user text, the fitting solution including data encoding modified sound processing parameters of the fitting applicable to the hearing device for solving the problem indicated by the user text;
wherein the user text is input into a machine learning algorithm that outputs the problem diagnosis text and the fitting solution, wherein the machine learning algorithm has been trained with user texts and corresponding problem diagnosis texts and fitting solutions solving the problem indicated by the user text;
wherein the evaluation system is further adapted for sending the data included in the fitting solution to the hearing device, the data configured to apply the fitting solution to the hearing device.

* * * * *